(12) United States Patent
Wang et al.

(10) Patent No.: US 9,680,620 B2
(45) Date of Patent: Jun. 13, 2017

(54) SIGNAL TRANSMISSION METHOD AND USER EQUIPMENT

(71) Applicant: Huawei Technologies Co., Ltd., Shenzhen (CN)

(72) Inventors: Jian Wang, Beijing (CN); Xiaocui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/750,768

(22) Filed: Jun. 25, 2015

(65) Prior Publication Data

US 2015/0358946 A1 Dec. 10, 2015

Related U.S. Application Data

(63) Continuation of application No. PCT/CN2014/088206, filed on Oct. 9, 2014.

(30) Foreign Application Priority Data

Jun. 9, 2014 (WO) ................ PCT/CN2014/079495

(51) Int. Cl.
*H04L 5/00* (2006.01)

(52) U.S. Cl.
CPC .................................. *H04L 5/0053* (2013.01)

(58) Field of Classification Search
CPC ..................................................... H04L 5/0053

(Continued)

(56) References Cited

U.S. PATENT DOCUMENTS

2007/0097981 A1* 5/2007 Papasakellariou .... H04L 1/1854
370/394
2011/0045837 A1 2/2011 Kim et al.
(Continued)

FOREIGN PATENT DOCUMENTS

CN 101610097 A 12/2009
CN 101931961 A 12/2010
(Continued)

OTHER PUBLICATIONS

"PHICH Resource Indexing with UL CA," 3GPP TSG RAN WG1 #61bis, Dresden, Germany, R1-103629, 3$^{rd}$ Generation Partnership Project, Valbonne, France (Jun. 28-Jul. 2, 2010).
(Continued)

*Primary Examiner* — Ronald B Abelson
(74) *Attorney, Agent, or Firm* — Leydig, Voit & Mayer, Ltd.

(57) ABSTRACT

Embodiments of the present disclosure provide a signal transmission method and a user equipment. The method includes: receiving, by a user equipment, an indication signal, where the indication signal is used to indicate resource numbers corresponding to physical resources occupied by one or more control signals, where a resource number corresponding to a physical resource includes time information and frequency information of the physical resource; allocating, by the user equipment according to the resource numbers, one or more physical resources corresponding to the one or more control signals; and sending, by the user equipment, the one or more control signals. With the embodiments of the present disclosure, energy consumption at a receive end can be saved.

18 Claims, 5 Drawing Sheets

(58) Field of Classification Search
USPC .................................................. 370/328, 329
See application file for complete search history.

(56) References Cited

U.S. PATENT DOCUMENTS

| | | |
|---|---|---|
| 2012/0093059 A1 | 4/2012 | Bai et al. |
| 2013/0044652 A1 | 2/2013 | Wang et al. |
| 2015/0131583 A1 | 5/2015 | Wang et al. |
| 2015/0201406 A1 | 7/2015 | Zhang |

FOREIGN PATENT DOCUMENTS

| | | |
|---|---|---|
| CN | 103379635 A | 10/2013 |
| CN | 103516493 A | 1/2014 |
| CN | 103716273 A | 4/2014 |
| CN | 103796309 A | 5/2014 |
| EP | 2413652 A1 | 2/2012 |
| EP | 2863550 A1 | 4/2015 |
| JP | 2010232740 A | 10/2010 |
| WO | WO 2011135916 A1 | 11/2011 |
| WO | WO 2014048301 A1 | 3/2014 |

OTHER PUBLICATIONS

"Resource allocation for D2D Mode 1 communication," 3GPP TSG-RAN WG1 Meeting #77, Seoul, Korea, R1-142429, $3^{rd}$ Generation Partnership Project, Valbonne, France (May 19-23, 2014).

"SA and Data Resource Allocation for Mode 1," 3GPP TSG-RAN WG1 Meeting #77, Seoul, Korea, R1-142232, $3^{rd}$ Generation Partnership Project, Valbonne, France (May 19-23, 2014).

Office Action in corresponding Japanese Patent Application No. 2016-526438 (Sep. 13, 2016).

"Discovery Signal Design," 3GPP TSG-RAN WG1 Meeting #76, Prague, Czech Republic, R1-140574, $3^{rd}$ Generation Partnership Project, Valbonne, France (Feb. 10-14, 2014).

Yamazaki et al., "Study on Interference Mitigation using random resource allocation for Device to Device Direct Communication underlaying LTE-Advanced Network," IEICE Technical Report, RCS2014-28(May 2014), vol. 114, Issue 80, pp. 49-54, The Institute of Electronics, Information and Communication Engineers, Tokyo, Japan (May 8, 2014).

* cited by examiner

Time sequence number

| | | P=0 | | | | | P=1 | | | | | P=2 | | | |
|---|---|---|---|---|---|---|---|---|---|---|---|---|---|---|---|
| | | 0 | 1 | 2 | 3 | 4 | 0 | 1 | 2 | 3 | 4 | 0 | 1 | 2 | 3 | 4 |
| Frequency sequence number | 0 | 0 | 1 | 2 | 3 | 4 | 40 | 41 | 42 | 43 | 44 | 20 | 21 | 22 | 23 | 24 |
| | 1 | 5 | 6 | 7 | 8 | 9 | 45 | 46 | 47 | 48 | 49 | 25 | 26 | 27 | 28 | 29 |
| | 2 | 10 | 11 | 12 | 13 | 14 | 50 | 51 | 52 | 53 | 54 | 30 | 31 | 32 | 33 | 34 |
| | 3 | 15 | 16 | 17 | 18 | 19 | 55 | 56 | 57 | 58 | 59 | 35 | 36 | 37 | 38 | 39 |
| | 4 | 20 | 21 | 22 | 23 | 24 | 0 | 1 | 2 | 3 | 4 | 40 | 41 | 42 | 43 | 44 |
| | 5 | 25 | 26 | 27 | 28 | 29 | 5 | 6 | 7 | 8 | 9 | 45 | 46 | 47 | 48 | 49 |
| | 6 | 30 | 31 | 32 | 33 | 34 | 10 | 11 | 12 | 13 | 14 | 50 | 51 | 52 | 53 | 54 |
| | 7 | 35 | 36 | 37 | 38 | 39 | 15 | 16 | 17 | 18 | 19 | 55 | 56 | 57 | 58 | 59 |
| | 8 | 40 | 41 | 42 | 43 | 44 | 20 | 21 | 22 | 23 | 24 | 0 | 1 | 2 | 3 | 4 |
| | 9 | 45 | 46 | 47 | 48 | 49 | 25 | 26 | 27 | 28 | 29 | 5 | 6 | 7 | 8 | 9 |
| | 10 | 50 | 51 | 52 | 53 | 54 | 30 | 31 | 32 | 33 | 34 | 10 | 11 | 12 | 13 | 14 |
| | 11 | 55 | 56 | 57 | 58 | 59 | 35 | 36 | 37 | 38 | 39 | 15 | 16 | 17 | 18 | 19 |

FIG. 3

Time sequence number

| | | P=0 | | | | | P=1 | | | | | P=2 | | | |
|---|---|---|---|---|---|---|---|---|---|---|---|---|---|---|---|
| | | 0 | 1 | 2 | 3 | 4 | 0 | 1 | 2 | 3 | 4 | 0 | 1 | 2 | 3 | 4 |
| Frequency sequence number | 0 | 0 | 1 | 2 | 3 | 4 | 1 | 2 | 3 | 4 | 0 | 2 | 3 | 4 | 0 | 1 |
| | 1 | 5 | 6 | 7 | 8 | 9 | 7 | 8 | 9 | 5 | 6 | 9 | 5 | 6 | 7 | 8 |
| | 2 | 10 | 11 | 12 | 13 | 14 | 13 | 14 | 10 | 11 | 12 | 11 | 12 | 13 | 14 | 10 |
| | 3 | 15 | 16 | 17 | 18 | 19 | 19 | 15 | 16 | 17 | 18 | 18 | 19 | 15 | 16 | 17 |
| | 4 | 20 | 21 | 22 | 23 | 24 | 21 | 22 | 23 | 24 | 20 | 22 | 23 | 24 | 20 | 21 |
| | 5 | 25 | 26 | 27 | 28 | 29 | 27 | 28 | 29 | 25 | 26 | 29 | 25 | 26 | 27 | 28 |
| | 6 | 30 | 31 | 32 | 33 | 34 | 33 | 34 | 30 | 31 | 32 | 31 | 32 | 33 | 34 | 30 |
| | 7 | 35 | 36 | 37 | 38 | 39 | 39 | 35 | 36 | 37 | 38 | 38 | 39 | 35 | 36 | 37 |
| | 8 | 40 | 41 | 42 | 43 | 44 | 41 | 42 | 43 | 44 | 40 | 42 | 43 | 44 | 40 | 41 |
| | 9 | 45 | 46 | 47 | 48 | 49 | 47 | 48 | 49 | 45 | 46 | 49 | 45 | 46 | 47 | 48 |
| | 10 | 50 | 51 | 52 | 53 | 54 | 53 | 54 | 50 | 51 | 52 | 51 | 52 | 53 | 54 | 50 |
| | 11 | 55 | 56 | 57 | 58 | 59 | 59 | 55 | 56 | 57 | 58 | 58 | 59 | 55 | 56 | 57 |

|  |  | Time sequence number | | | | | | | | | | | |
|---|---|---|---|---|---|---|---|---|---|---|---|---|---|
|  |  | 0 | 1 | 2 | 3 | 4 | 5 | 6 | 7 | 8 | 9 | 10 | 11 |
| Frequency sequence number | 0 | 0 | 11 | 10 | 9 | 8 | 7 | 6 | 5 | 4 | 3 | 2 | 1 |
| | 1 | 1 | 0 | 11 | 10 | 9 | 8 | 7 | 6 | 5 | 4 | 3 | 2 |
| | 2 | 2 | 1 | 0 | 11 | 10 | 9 | 8 | 7 | 6 | 5 | 4 | 3 |
| | 3 | 3 | 2 | 1 | 0 | 11 | 10 | 9 | 8 | 7 | 6 | 5 | 4 |
| | 4 | 4 | 3 | 2 | 1 | 0 | 11 | 10 | 9 | 8 | 7 | 6 | 5 |
| | 5 | 5 | 4 | 3 | 2 | 1 | 0 | 11 | 10 | 9 | 8 | 7 | 6 |
| | 6 | 6 | 5 | 4 | 3 | 2 | 1 | 0 | 11 | 10 | 9 | 8 | 7 |
| | 7 | 7 | 6 | 5 | 4 | 3 | 2 | 1 | 0 | 11 | 10 | 9 | 8 |
| | 8 | 8 | 7 | 6 | 5 | 4 | 3 | 2 | 1 | 0 | 11 | 10 | 9 |
| | 9 | 9 | 8 | 7 | 6 | 5 | 4 | 3 | 2 | 1 | 0 | 11 | 10 |
| | 10 | 10 | 9 | 8 | 7 | 6 | 5 | 4 | 3 | 2 | 1 | 0 | 11 |
| | 11 | 11 | 10 | 9 | 8 | 7 | 6 | 5 | 4 | 3 | 2 | 1 | 0 |

US 9,680,620 B2

SIGNAL TRANSMISSION METHOD AND USER EQUIPMENT

CROSS-REFERENCE TO RELATED APPLICATIONS

This application is a continuation of International Patent Application No. PCT/CN2014/088206, filed on Oct. 9, 2014, which claims priority to International Patent Application No. PCT/CN2014/079495, filed on Jun. 9, 2014, both of which are hereby incorporated by reference in their entireties.

TECHNICAL FIELD

The present disclosure relates to the field of communications and, more specifically, to a signal transmission method and a user equipment.

BACKGROUND

The device to device proximity service (Device to Device Proximity Service, "D2D ProSe" for short) between user equipments (User Equipment, "UE" for short) has become a hot topic of the Long Term Evolution (Long Term Evolution, "LTE" for short) system.

D2D ProSe relates to a data signal and a control signal, where the control signal is used to indicate a frequency resource occupied by the data signal, and the data signal is used to carry data.

However, in an existing LTE communications system, a receive end cannot determine a time resource occupied by a control signal, and needs to perform blind detection on all possible time resources, so as to obtain the control signal, causing that the receive end needs to consume more time and electric energy to acquire the control signal.

SUMMARY

Embodiments of the present disclosure provide a signal transmission method and a user equipment, which can reduce energy consumption at a receive end.

According to a first aspect, a signal transmission method is provided, including: receiving, by a user equipment, an indication signal, where the indication signal is used to indicate resource numbers of physical resources occupied by one or more control signals, for example, a scheduling assignment (Scheduling Assignment, "SA" for short) signal, where the resource number includes time information and frequency information of the physical resource; allocating, by the user equipment according to the resource numbers, corresponding physical resources to the one or more control signals; and sending, by the user equipment, the one or more control signals.

With reference to the first aspect, in a first implementation manner of the first aspect, the resource numbers are determined after the physical resources occupied by the one or more control signals are grouped, the time information is a time sequence number, and the frequency information is a frequency sequence number, where a same resource number in different physical resource groups is corresponding to a same time sequence number and a same frequency sequence number, or a same resource number in different physical resource groups is corresponding to a same time sequence number and different frequency sequence numbers, or a same resource number in different physical resource groups is corresponding to different time sequence numbers and a same frequency sequence number, or a same resource number in different physical resource groups is corresponding to different time sequence numbers and different frequency sequence numbers.

With reference to the first possible implementation manner of the first aspect, in a second implementation manner, when a same resource number in different physical resource groups is corresponding to a same time sequence number and a same frequency sequence number, each of the physical resource groups includes M time resources; each of the time resources includes N frequency resources; and therefore a time sequence number of a physical resource whose resource number is x is mod(x, M), and a frequency sequence number of the physical resource is floor(x/M), where mod( ) is a modulo function, floor( ) is a floor function, x is zero or a positive integer, and M and N are positive integers.

With reference to the first possible implementation manner of the first aspect, in a third implementation manner, when a same resource number in different physical resource groups is corresponding to a same time sequence number and different frequency sequence numbers, each of the physical resource groups includes M time resources; each of the time resources includes N frequency resources; and therefore a time sequence number of a physical resource whose resource number is x is mod(x, M), and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

With reference to the first possible implementation manner of the first aspect, in a fourth implementation manner, when a same resource number in different physical resource groups is corresponding to different time sequence numbers and a same frequency sequence number, each of the physical resource groups includes M time resources; each of the time resources includes N frequency resources; and therefore a time sequence number of a physical resource whose resource number is x is:

$$\mathrm{mod}\ \{\mathrm{mod}(x,M)-\mathrm{mod}\ [[\mathrm{floor}(x/M)+1]*Q_t*P,M-1], M\},$$

$$\mathrm{mod}\ \{\mathrm{mod}(x,M)+\mathrm{mod}\ [[\mathrm{floor}(x/M)+1]*Q_t*P,M-1], M\},$$

$$\mathrm{mod}\ \{\mathrm{mod}(x,M)-[\mathrm{mod}\ [\mathrm{floor}(x/M),M-1]+1]*Q_t*P, M\},\ \mathrm{or}$$

$$\mathrm{mod}\ \{\mathrm{mod}(x,M)+[\mathrm{mod}\ [\mathrm{floor}(x/M),M-1]+1]*Q_t*P, M\},$$

and a frequency sequence number of the physical resource is floor(x/M), where mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

With reference to the first possible implementation manner of the first aspect, in a fifth implementation manner, when a same resource number in different physical resource groups is corresponding to different time sequence numbers and different frequency sequence numbers, each of the physical resource groups includes M time resources; each of the time resources includes N frequency resources; and therefore a time sequence number of a physical resource whose resource number is x is:

$$\mod\{\mod(x,M)-\mod[[\text{floor}(x/M)+1]*Q_t*P, M-1], M\},$$

$$\mod\{\mod(x,M)+\mod[[\text{floor}(x/M)+1]*Q_t*P, M-1], M\},$$

$$\mod\{\mod(x,M)-[\mod[\text{floor}(x/M),M-1]+1]*Q_t*P, M\}, \text{ or}$$

$$\mod\{\mod(x,M)+[\mod[\text{floor}(x/M),M-1]+1]*Q_t*P, M\},$$

and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

With reference to any one of the second to the fifth possible implementation manners of the first aspect, in a sixth implementation manner, M is a positive integer greater than or equal to 2 and/or N is a positive integer greater than or equal to 2.

With reference to the first aspect, in a seventh possible implementation manner, the time information is a time resource number, the frequency information is a frequency resource number, and among different time resource numbers, a same frequency resource number is corresponding to a same frequency sequence number or different frequency sequence numbers.

With reference to the seventh possible implementation manner of the first aspect, in an eighth possible implementation manner, when among different time resource numbers, a same frequency resource number is corresponding to a same frequency sequence number, a frequency sequence number of a physical resource whose frequency resource number is x is mod(x, N), where mod( ) is a modulo function, x is zero or a positive integer, and N is a positive integer and indicates a quantity of frequency resource numbers corresponding to each time sequence number.

With reference to the seventh possible implementation manner of the first aspect, in a ninth possible implementation manner, when among different time resource numbers, a same frequency resource number is corresponding to different frequency sequence numbers, a frequency sequence number of a physical resource whose frequency resource number is x is mod(x+$P_t$*$Q_f$, N), where mod( ) is a modulo function, $P_t$ indicates a time sequence number and is zero or a positive integer, N indicates a quantity of frequency resource numbers corresponding to each time sequence number, $Q_f$ is a frequency hopping step, x is zero or a positive integer, and N and $Q_f$ are positive integers.

With reference to the eighth or the ninth possible implementation manner of the first aspect, in a tenth possible implementation manner, N is a positive integer greater than or equal to 2.

With reference to the third or the ninth possible implementation manner of the first aspect, in an eleventh possible implementation manner, $Q_f$ is determined by a cell identity.

With reference to the eleventh possible implementation manner of the first aspect, in a twelfth possible implementation manner, $Q_f$=mod(ID_cell, N), where ID_cell is the cell identity.

With reference to the twelfth possible implementation manner of the first aspect, in a thirteenth possible implementation manner, the cell identity is a physical cell identity.

With reference to the fourth possible implementation manner of the first aspect, in a fourteenth possible implementation manner, $Q_t$ is determined by a cell identity.

With reference to the fourteenth possible implementation manner of the first aspect, in a fifteenth possible implementation manner, $Q_t$=mod(ID_cell,M), where ID_cell is the cell identity.

With reference to the fifteenth possible implementation manner of the first aspect, in a sixteenth possible implementation manner, the cell identity is a physical cell identity.

With reference to the fifth possible implementation manner of the first aspect, in a seventeenth possible implementation manner, $Q_f$ and $Q_t$ are determined by a cell identity.

With reference to the seventeenth possible implementation manner of the first aspect, in an eighteenth possible implementation manner, $Q_f$=mod(ID_cell, N) and $Q_t$=mod(ID_cell,M), where ID_cell is the cell identity.

With reference to the eighteenth possible implementation manner of the first aspect, in a nineteenth possible implementation manner, the cell identity is a physical cell identity.

With reference to the first aspect, in a twentieth implementation manner of the first aspect, that the user equipment groups the physical resources occupied by the one or more control signals includes the following: The user equipment groups, according to a correspondence between resource numbers and physical resources occupied by one or more control signals, the physical resources occupied by the one or more control signals, where the correspondence between resource numbers and physical resources occupied by one or more control signals is preset, is fed back from a receive end, or is provided by a third party.

With reference to the twentieth implementation manner of the first aspect, in a twenty-first implementation manner of the first aspect, the method includes: sending, by the user equipment, the correspondence between resource numbers and physical resources occupied by one or more control signals to the receive end.

With reference to the first aspect or any one of the second to the twenty-first possible implementation manners of the first aspect, in a twenty-second implementation manner of the first aspect, the receiving, by a user equipment, an indication signal includes: receiving, by the user equipment, an indication signal sent by a base station.

According to a second aspect, a user equipment is provided, including: a receiving unit, configured to receive an indication signal, where the indication signal is used to indicate resource numbers of physical resources occupied by one or more control signals, for example, a scheduling assignment (Scheduling Assignment, "SA" for short) signal, where the resource number includes time information and frequency information of the physical resource; an allocating unit, configured to allocate corresponding physical resources to the one or more control signals according to the resource numbers; and a sending unit, configured to send the one or more control signals.

With reference to the second aspect, in a first possible implementation manner, the resource numbers are determined after the physical resources occupied by the one or more control signals are grouped, the time information is a time sequence number, and the frequency information is a frequency sequence number, where a same resource number in different physical resource groups is corresponding to a same time sequence number and a same frequency sequence number, or a same resource number in different physical resource groups is corresponding to a same time sequence number and different frequency sequence numbers, or a same resource number in different physical resource groups is corresponding to different time sequence numbers and a same frequency sequence number, or a same resource number in different physical resource groups is corresponding to different time sequence numbers and different frequency sequence numbers.

With reference to the first possible implementation manner of the second aspect, in a second possible implementation manner, when a same resource number in different physical resource groups is corresponding to a same time sequence number and a same frequency sequence number, each of the physical resource groups includes M time resources; each of the time resources includes N frequency resources; and therefore a time sequence number of a physical resource whose resource number is x is mod(x, M), and a frequency sequence number of the physical resource is floor(x/M), where mod( ) is a modulo function, floor( ) is a floor function, x is zero or a positive integer, and M and N are positive integers.

With reference to the first possible implementation manner of the second aspect, in a third possible implementation manner, when a same resource number in different physical resource groups is corresponding to a same time sequence number and different frequency sequence numbers, each of the physical resource groups includes M time resources; each of the time resources includes N frequency resources; and therefore a time sequence number of a physical resource whose resource number is x is mod(x, M), and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

With reference to the first possible implementation manner of the second aspect, in a fourth possible implementation manner, when a same resource number in different physical resource groups is corresponding to different time sequence numbers and a same frequency sequence number, each of the physical resource groups includes M time resources; each of the time resources includes N frequency resources; and therefore a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is floor(x/M), where mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

With reference to the first possible implementation manner of the second aspect, in a fifth implementation manner, when a same resource number in different physical resource groups is corresponding to different time sequence numbers and different frequency sequence numbers, each of the physical resource groups includes M time resources; each of the time resources includes N frequency resources; and therefore a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

With reference to any one of the second to the fifth possible implementation manners of the second aspect, in a sixth implementation manner, M is a positive integer greater than or equal to 2 and/or N is a positive integer greater than or equal to 2.

With reference to the second aspect, in a seventh implementation manner, the time information is a time resource number, the frequency information is a frequency resource number, and among different time resource numbers, a same frequency resource number is corresponding to a same frequency sequence number or different frequency sequence numbers.

With reference to the seventh possible implementation manner of the second aspect, in an eighth implementation manner, when among different time resource numbers, a same frequency resource number is corresponding to a same frequency sequence number, a frequency sequence number of a physical resource whose frequency resource number is x is mod(x, N), where mod( ) is a modulo function, x is zero or a positive integer, and N is a positive integer and indicates a quantity of frequency resource numbers corresponding to each time sequence number.

With reference to the seventh possible implementation manner of the second aspect, in a ninth implementation manner, when among different time resource numbers, a same frequency resource number is corresponding to different frequency sequence numbers, a frequency sequence number of a physical resource whose frequency resource number is x is mod(x+$P_t$*$Q_f$, N), where mod( ) is a modulo function, $P_t$ indicates a time sequence number and is zero or a positive integer, N indicates a quantity of frequency resource numbers corresponding to each time sequence number, $Q_f$ is a frequency hopping step, x is zero or a positive integer, and N and $Q_f$ are positive integers.

With reference to the eighth or the ninth possible implementation manner of the second aspect, in a tenth possible implementation manner, N is a positive integer greater than or equal to 2.

With reference to the third or the ninth possible implementation manner of the second aspect, in an eleventh possible implementation manner, $Q_f$ is determined by a cell identity.

With reference to the eleventh possible implementation manner of the second aspect, in a twelfth possible implementation manner, $Q_f$=mod(ID_cell, N), where ID_cell is the cell identity.

With reference to the twelfth possible implementation manner of the second aspect, in a thirteenth possible implementation manner, the cell identity is a physical cell identity.

With reference to the fourth possible implementation manner of the second aspect, in a fourteenth possible implementation manner, $Q_t$ is determined by a cell identity.

With reference to the fourteenth possible implementation manner of the second aspect, in a fifteenth possible implementation manner, $Q_t$=mod(ID_cell,M), where ID_cell is the cell identity.

With reference to the fifteenth possible implementation manner of the second aspect, in a sixteenth possible implementation manner, the cell identity is a physical cell identity.

With reference to the fifth possible implementation manner of the second aspect, in a seventeenth possible implementation manner, $Q_f$ and $Q_t$ are determined by a cell identity.

With reference to the seventeenth possible implementation manner of the second aspect, in an eighteenth possible implementation manner, $Q_f$=mod(ID_cell, N) and $Q_t$=mod(ID_cell,M), where ID_cell is the cell identity.

With reference to the eighteenth possible implementation manner of the second aspect, in a nineteenth possible implementation manner, the cell identity is a physical cell identity.

With reference to the second aspect, in a twentieth implementation manner of the second aspect, the user equipment includes a grouping unit, configured to group, according to a correspondence between resource numbers and physical resources occupied by one or more control signals, the physical resources occupied by the one or more control signals, where the correspondence between resource numbers and physical resources occupied by one or more control signals is preset, is fed back from a receive end, or is provided by a third party.

With reference to the twentieth implementation manner of the second aspect, in a twenty-first implementation manner of the second aspect, the sending unit is specifically configured to send the correspondence between resource numbers and physical resources occupied by one or more control signals to the receive end.

With reference to the second aspect or any one of the first to the twenty-first implementation manners of the second aspect, in a twenty-second implementation manner of the second aspect, the receiving unit is specifically configured to receive an indication signal sent by a base station.

Based on the foregoing technical solution, in the embodiments of the present disclosure, a user equipment may receive an indication signal, where the indication signal is used to indicate resource numbers of physical resources occupied by one or more control signals, where the resource number includes time information and frequency information of the physical resource; the user equipment allocates corresponding physical resources to the one or more control signals according to the resource numbers; and the user equipment sends the one or more control signals. Therefore, a physical resource that carries a control signal can be accurately indicated, thereby saving processing time and electric energy consumption at a receive end, and improving network performance.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 3 is another schematic diagram of a result of grouping physical resources that carry control signals in the signal transmission method according to the embodiment of the present disclosure;

FIG. 4 is still another schematic diagram of a result of grouping physical resources that carry control signals in the signal transmission method according to the embodiment of the present disclosure;

FIG. 5 is still another schematic diagram of a result of grouping physical resources that carry control signals in the signal transmission method according to the embodiment of the present disclosure;

FIG. 6 is a schematic diagram of a result of indicating a physical resource that carries a control signal in the signal transmission method according to the embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, for example, a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE Frequency Division Duplex (Frequency Division Duplex, FDD) system, an LTE Time Division Duplex (Time Division Duplex, TDD) system, a Universal Mobile Telecommunications System (Universal Mobile Telecommunication System, UMTS), or a Worldwide Interoperability for Microwave Access (Worldwide Interoperability for Microwave Access, WiMAX) communications system.

It should be understood that in the embodiments of the present disclosure, a user equipment (User Equipment, "UE" for short) includes but is not limited to a mobile station (Mobile Station, "MS" for short), a mobile terminal (Mobile Terminal), a mobile telephone (Mobile Telephone), a handset (handset), a portable equipment (portable equipment), and the like. The user equipment may communicate with one or more core networks by using a radio access network (Radio Access Network, "RAN" for short). For example, the user equipment may be a mobile telephone (or referred to as a "cellular" telephone), or a computer provided with a wireless communication function; the user equipment may further be a portable, pocket-sized, handheld, computer-embedded, or vehicle-mounted mobile apparatus.

It should also be understood that the user equipment and the second user equipment in the embodiments of the present disclosure are only for ease of description without imposing any limitation.

In the embodiments of the present disclosure, a base station may be a base transceiver station (Base Transceiver Station, "BTS" for short) in GSM or CDMA, may also be an NodeB (NodeB) in WCDMA, may further be an evolved NodeB (evolved NodeB, eNB or "e-NodeB" for short) in LTE, and may also be a cluster head (Cluster Head) of a user cluster in D2D communications, which is not limited in the embodiments of the present disclosure.

Figures 1, 2:
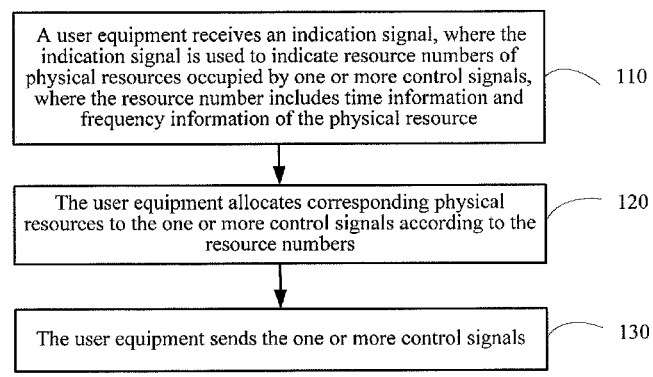
FIG. 1 is a schematic flowchart of a signal transmission method according to an embodiment of the present disclosure.
FIG. 2 is a schematic diagram of a result of grouping physical resources that carry control signals in the signal transmission method according to the embodiment of the present disclosure.

FIG. 1 is a schematic flowchart of a signal transmission method according to an embodiment of the present disclosure. As shown in FIG. 1, the method includes:

110. A user equipment receives an indication signal, where the indication signal is used to indicate resource numbers of physical resources occupied by one or more control signals, for example, a scheduling assignment (Scheduling Assignment, "SA" for short) signal, where the resource number includes time information and frequency information of the physical resource.

Specifically, the user equipment may receive an indication signal sent by a base station, which is not limited in this embodiment of the present disclosure. For example, the user equipment may also receive an indication signal according to a feedback of a receive end, and may also receive an indication signal according to preconfiguration.

120. The user equipment allocates corresponding physical resources to the one or more control signals according to the resource numbers.

Specifically, the resource number may indicate one or more physical resource units, for example, two, three, five, or ten physical resource units, and each of the physical resource units is uniquely identified by a time sequence number and a frequency sequence number, which is not limited in this embodiment of the present disclosure.

It should be understood that the user equipment may allocate, by using multiple methods, the corresponding physical resources to the one or more control signals, which is not limited in this embodiment of the present disclosure.

130. The user equipment sends the one or more control signals.

It should be understood that the user equipment may send the one or more control signals by using multiple methods, which is not limited in this embodiment of the present disclosure.

In this embodiment of the present disclosure, a physical resource that carries a control signal can be accurately indicated, and therefore a receive end can receive the control signal without a need to perform blind detection, thereby saving processing time and energy consumption at the receive end.

The foregoing description describes in detail the signal transmission method in this embodiment of the present disclosure with reference to FIG. 1 from the perspective of a user equipment.

The following further describes this embodiment of the present disclosure in detail with reference to specific examples. It should be noted that an example in FIG. 1 is merely intended to help a person skilled in the art understand this embodiment of the present disclosure, rather than limit this embodiment of the present disclosure to a specific value or a specific scenario in the example. A person skilled in the art can certainly make various equivalent modifications or changes according to the example given in FIG. 1, which also fall within the protection scope of this embodiment of the present disclosure.

With reference to FIG. 2 to FIG. 5, the following specifically describes the signal transmission method in this embodiment of the present disclosure. FIG. 2 to FIG. 5 are several schematic diagrams of results of grouping physical resources that carry control signals in the signal transmission method according to this embodiment of the present disclosure.

According to this embodiment of the present disclosure, the resource numbers are determined after the physical resources occupied by the one or more control signals are grouped, the time information is a time sequence number, and the frequency information is a frequency sequence number, where a same resource number in different physical resource groups is corresponding to a same time sequence number and a same frequency sequence number, or a same resource number in different physical resource groups is corresponding to a same time sequence number and different frequency sequence numbers, or a same resource number in different physical resource groups is corresponding to different time sequence numbers and a same frequency sequence number, or a same resource number in different physical resource groups is corresponding to different time sequence numbers and different frequency sequence numbers.

Specifically, the resource numbers are determined after the base station, the user equipment, or a third party groups the physical resources occupied by the one or more control signals, which is not limited in this embodiment of the present disclosure.

Specifically, M time resources, for example, a radio frame, a subframe, and a timeslot, may be classified into one group. Each of the time resources further includes N frequency resources, for example, a physical resource block (Physical Resource Block, "PRB" for short) and a subcarrier, where M and N are positive integers, which is not limited in this embodiment of the present disclosure.

It should be understood that, after the grouping, in the physical resource groups, a same resource number determined according to a preset grouping method may fall into four occasions: having a same time sequence number and a same frequency sequence number, or having a same time sequence number and different frequency sequence numbers, or having different time sequence numbers and a same frequency sequence number, or having different time sequence numbers and different frequency sequence numbers. Grouping methods meeting the foregoing for occasions all fall within the protection scope of this embodiment of the present disclosure.

According to this embodiment of the present disclosure, when a same resource number in different physical resource groups is corresponding to a same time sequence number and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is floor(x/M), where mod( ) is a modulo function, floor( ) is a floor function, x is zero or a positive integer, and M and N are positive integers.

Specifically, as shown in FIG. 2, M is 5, and the time sequence number is from 0 to 4. N is 12, and the frequency sequence number is from 0 to 11. These time resources and frequency resources are numbered in a left-to-right order and a top-to-bottom order, so as to obtain a total of M×N 60 resource numbers. A time sequence number of each physical resource whose resource number is x is mod(x, M), and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is mod(x, M) and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In the foregoing embodiment, a same resource number in different physical resource groups is corresponding to a same physical resource. That is, physical resources corresponding to each of two resource numbers, for example, resource number 1 and resource number 21 in FIG. 2, in different physical resource groups are always the same, and a frequency spacing is always the same. Likewise, a time spacing of two resource numbers, for example, resource number 1 and resource number 5 in FIG. 2, in different physical resource groups is always the same. In this case, when data is sent by using a same resource number, a physical resource used in different physical resource groups is always the same. Therefore, interference to a system is always the same in different physical resource groups, and interference randomization cannot be achieved.

In order to overcome the problem existent in FIG. 2, another embodiment is put forward. When a same resource number in different physical resource groups is corresponding to a same time sequence number and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

Specifically, as shown in FIG. 3, the sequence number P of a physical resource group is from 0 to 2, M is 5, and the time sequence number is from 0 to 4. N is 12, the frequency sequence number is from 0 to 11, and $Q_f$ is 4. These time resources and frequency resources are numbered. A time sequence number of each physical resource whose resource number is x is mod(x, M), and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is mod(x, M) and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, frequency sequence numbers of physical resources corresponding to each of two resource numbers, for example, resource number 1 and resource number 21 in FIG. 3, in different physical resource groups are different. In this case, when data is sent by using a same resource number, frequency sequence numbers of physical resources used in different physical resource groups are different. Therefore, frequency-domain interference to a system is different in different physical resource groups, and frequency-domain interference randomization can be achieved.

In order to overcome the problem existent in FIG. 2, another embodiment is put forward. When a same resource number in different physical resource groups is corresponding to different time sequence numbers and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

$$\mathrm{mod}\ \{\mathrm{mod}(x,M) - \mathrm{mod}\ [[\mathrm{floor}(x/M)+1]*Q_t*P, M-1], M\},$$

$$\mathrm{mod}\ \{\mathrm{mod}(x,M) + \mathrm{mod}\ [[\mathrm{floor}(x/M)+1]*Q_t*P, M-1], M\},$$

$$\mathrm{mod}\ \{\mathrm{mod}(x,M) - [\mathrm{mod}\ [\mathrm{floor}(x/M), M-1]+1]*Q_t*P, M\},\ \mathrm{or}$$

$$\mathrm{mod}\ \{\mathrm{mod}(x,M) + [\mathrm{mod}\ [\mathrm{floor}(x/M), M-1]+1]*Q_t*P, M\},$$

and a frequency sequence number of the physical resource is floor(x/M), where mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

Specifically, as shown in FIG. 4, the sequence number P of the physical resource group is from 0 to 2, M is 5, and the time sequence number is from 0 to 4. N is 12, the frequency sequence number is from 0 to 11, and $Q_t$ is 1. These time resources and frequency resources are numbered. A time sequence number of each physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers of physical resources corresponding to each of two resource numbers, for example, resource number 1 and resource number 21 in FIG. 4, in different physical resource groups are different. In this case, when data is sent by using a same resource number, time sequence numbers of physical resources used in different physical resource groups are different. Therefore, time-domain interference to a system is different in different physical resource groups, and time-domain interference randomization can be achieved.

The embodiment in FIG. 3 overcomes the problem of frequency-domain interference, but a problem that time-domain interference cannot be randomized still exists; likewise, the embodiment in FIG. 4 overcomes the problem of time-domain interference, but a problem that frequency-domain interference cannot be randomized still exists; therefore, system performance is still affected.

In order to better overcome the problem existent in FIG. 2, another embodiment is put forward. When a same resource number in different physical resource groups is corresponding to different time sequence numbers and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

Figures 5, 6:
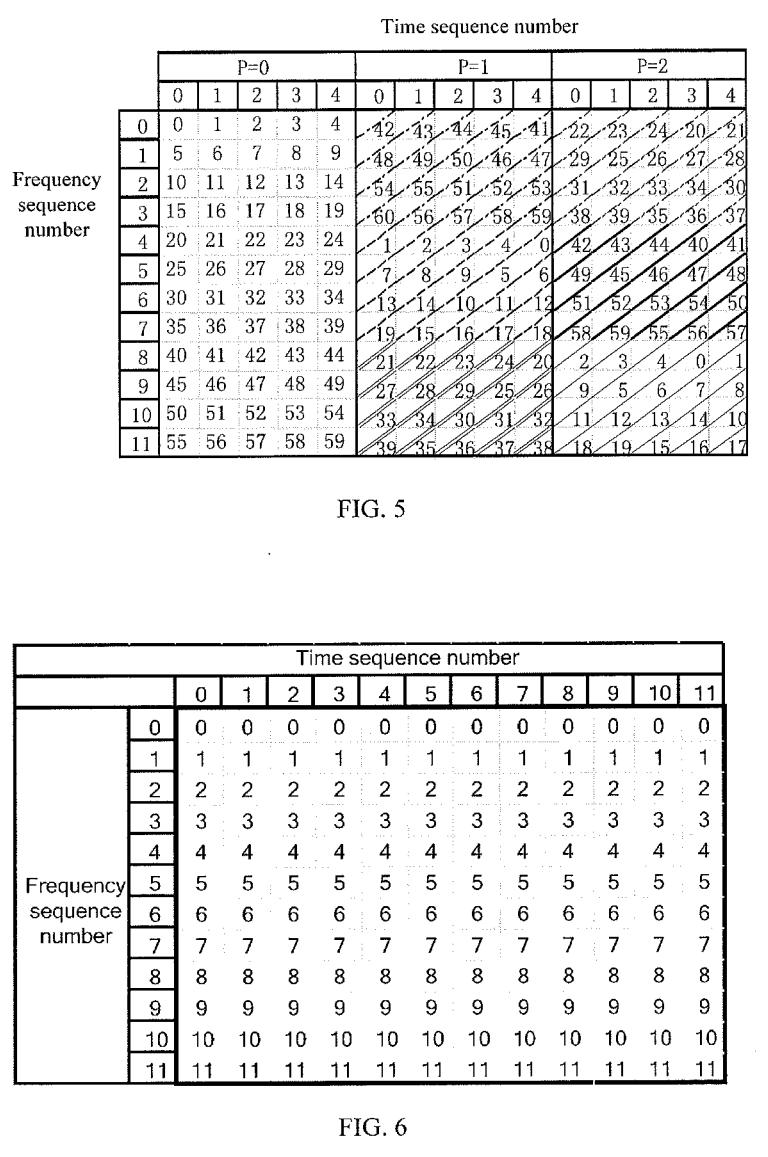

Specifically, as shown in FIG. 5, the sequence number P of the physical resource group is from 0 to 2, M is 5, and the time sequence number is from 0 to 4. N is 12, the frequency sequence number is from 0 to 11, $Q_t$ is 1, and $Q_f$ is 4. These time resources and frequency resources are numbered. A time sequence number of each physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers and frequency sequence numbers of physical resources corresponding to each of two resource numbers, for example, resource number 1 and resource number 21 in FIG. 5, in different physical resource groups are different. In this case, when data is sent by using a same resource number, time sequence numbers and frequency sequence numbers of physical resources used in different physical resource groups are different. Therefore, time-domain interference and frequency-domain interference to a system are different in different physical resource groups, and time-domain interference randomization and frequency-domain interference randomization can be achieved.

Correspondingly, in another embodiment, M may be a positive integer greater than or equal to 2 and/or N may be a positive integer greater than or equal to 2.

It should be understood that the grouping of multiple time resources and/or multiple frequency resources can better reflect a technical advantage of this embodiment of the present disclosure in solving the technical problem that a scheduling assignment signal cannot accurately indicate a physical resource that carries a control signal.

According to this embodiment of the present disclosure, the time information is a time resource number, the frequency information is a frequency resource number, and among different time resource numbers, a same frequency resource number is corresponding to a same frequency sequence number or different frequency sequence numbers.

Specifically, the time resource number may include one or more time sequence numbers, which is not limited in this embodiment of the present disclosure.

It should be understood that, a same frequency resource number determined according to a preset method among different time resource numbers or among different time sequence numbers, may be corresponding to a same frequency sequence number or different frequency sequence numbers. Methods that meet these two occasions fall within the protection scope of this embodiment of the present disclosure.

Alternatively, in another embodiment, when among different time resource numbers, a same frequency resource number is corresponding to a same frequency sequence number, a frequency sequence number of a physical resource whose frequency resource number is x is mod(x, N), where mod( ) is a modulo function, x is zero or a positive integer, and N is a positive integer and indicates a quantity of frequency resource numbers corresponding to each time sequence number.

FIG. 6 is a schematic diagram of a result of indicating a physical resource that carries a control signal in a signal transmission method according to another embodiment of the present disclosure. Specifically, as shown in FIG. 6, the time sequence number is from 0 to 11, N is 12, and the frequency sequence number is from 0 to 11. A frequency sequence number of a physical resource whose frequency resource number is x is mod(x, N). That is, an indication signal may instruct to use any physical resource whose time sequence number is specified and whose frequency sequence number is mod(x, N) to carry a control signal, so that a receive end can detect and acquire the control signal on the physical resource whose time sequence number is specified and whose frequency sequence number is mod(x, N).

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

Alternatively, in another embodiment, when among different time resource numbers, a same frequency resource number is corresponding to different frequency sequence numbers, a frequency sequence number of a physical resource whose frequency resource number is x is $mod(x+P_t*Q_f, N)$, where mod( ) is a modulo function, $P_t$ indicates a time sequence number and is zero or a positive integer, N indicates a quantity of frequency resource numbers corresponding to each time sequence number, that is, a quantity of frequency sequence numbers, $Q_f$ is a frequency hopping step, x is zero or a positive integer, and N and $Q_f$ are positive integers.

Figures 7, 8:
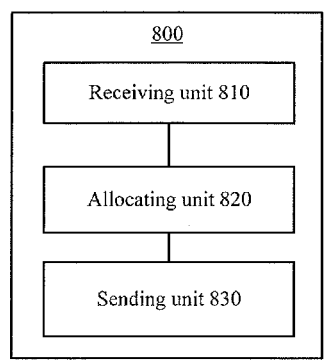
FIG. 7 is another schematic diagram of a result of indicating a physical resource that carries a control signal in the signal transmission method according to the embodiment of the present disclosure.
FIG. 8 is a schematic block diagram of a user equipment according to an embodiment of the present disclosure.

FIG. 7 is a schematic diagram of a result of indicating a physical resource that carries a control signal in a signal transmission method according to another embodiment of the present disclosure. Specifically, as shown in FIG. 7, the time sequence number $P_t$ is from 0 to 11, N is 12, the frequency sequence number is from 0 to 11, and $Q_f$ is 1. A frequency sequence number of a physical resource whose frequency resource number is x is $mod(x+P_t*Q_f, N)$. That is, an indication signal may instruct to use a physical resource whose time sequence number is $P_t$ and whose frequency sequence number is $mod(x+P_t*Q_f, N)$ to carry a control signal, so that a receive end can detect and acquire the control signal on the physical resource whose time sequence number is $P_t$ and whose frequency sequence number is $mod(x+P_t*Q_f, N)$.

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

In addition, in the foregoing embodiment, among different time sequence numbers, a same frequency resource number is corresponding to different frequency sequence numbers. That is, among different time sequence numbers, frequency sequence numbers corresponding to each of two frequency resource numbers are different, for example, frequency resource number 1 and frequency resource number 5 in FIG. 7. In this case, frequency-domain interference randomization can be achieved.

Correspondingly, in another embodiment, $Q_f$ and/or $Q_t$ may be determined by a cell identity, for example, $Q_f$=mod(ID_cell, N) and/or $Q_t$=mod(ID_cell,M), where ID_cell is the cell identity.

It should be understood that, by using the cell identity to determine the frequency hopping step and/or the timing hopping step, inter-cell interference randomization may be achieved, thereby helping the receive end to suppress or cancel inter-cell interference.

Alternatively, in another embodiment, the cell identity may be a physical cell identity (Physical Cell identity, "PCI" for short).

It should be understood that, in an LTE communications system, by using the physical cell identity to determine the frequency hopping step and/or the timing hopping step, inter-cell interference randomization may be achieved, thereby helping the receive end to suppress or cancel inter-cell interference.

Alternatively, in another embodiment, that the resource numbers are determined after the user equipment groups the physical resources occupied by the one or more control signals includes the following: The user equipment determines the resource numbers according to a result of the grouping, where the result of the grouping is acquired from the third party or the receive end, that is, the receive end or the third party groups the physical resources occupied by the one or more control signals.

Alternatively, in another embodiment, that the resource numbers are determined after the user equipment groups the physical resources occupied by the one or more control signals includes the following: The user equipment groups, according to a correspondence between resource numbers and physical resources occupied by one or more control signals, the physical resources occupied by the one or more control signals; and then determines the resource numbers according to a result of the grouping, where the correspondence between resource numbers and physical resources occupied by one or more control signals is preset, is fed back from the receive end, or is provided by the third party.

Alternatively, in another embodiment, the method includes: sending, by the user equipment, the correspondence between resource numbers and physical resources occupied by one or more control signals to the receive end.

Optionally, that a user equipment receives an indication signal includes the following: The user equipment receives an indication signal sent by the base station.

FIG. 8 is a schematic block diagram of a user equipment according to an embodiment of the present disclosure. As shown in FIG. 8, a user equipment 800 includes a receiving unit 810, an allocating unit 820, and a sending unit 830.

Specifically, the receiving unit 810 is configured to receive an indication signal, where the indication signal is used to indicate resource numbers of physical resources occupied by one or more control signals, for example, a scheduling assignment (Scheduling Assignment, "SA" for short) signal, where the resource number includes time information and frequency information of the physical resource; the allocating unit 820 is configured to allocate corresponding physical resources to the one or more control signals according to the resource numbers; and the sending unit 830 is configured to send the one or more control signals.

The user equipment provided in this embodiment of the present disclosure can accurately indicate a physical resource that carries a control signal, and therefore a receive end can receive the control signal without a need to perform blind detection, thereby saving processing time and electric energy consumption at the receive end.

The user equipment in FIG. 8 is corresponding to the signal transmission method in FIG. 1, and therefore the user equipment in this embodiment of the present disclosure may be described in detail with reference to FIG. 2 to FIG. 7. FIG. 2 to FIG. 5 are several schematic diagrams of results of grouping physical resources that carry control signals in the signal transmission method according to an embodiment of the present disclosure, and FIG. 6 and FIG. 7 are schematic diagrams of results of indicating a physical resource that carries a control signal in the signal transmission method according to another embodiment of the present disclosure.

According to this embodiment of the present disclosure, the resource numbers are determined after the physical resources occupied by the one or more control signals are grouped, the time information is a time sequence number, and the frequency information is a frequency sequence number, where a same resource number in different physical resource groups is corresponding to a same time sequence number and a same frequency sequence number, or a same resource number in different physical resource groups is corresponding to a same time sequence number and different frequency sequence numbers, or a same resource number in different physical resource groups is corresponding to different time sequence numbers and a same frequency sequence number, or a same resource number in different physical resource groups is corresponding to different time sequence numbers and different frequency sequence numbers.

Specifically, the resource numbers are determined after a base station, the user equipment, or a third party groups the physical resources occupied by the one or more control signals, which is not limited in this embodiment of the present disclosure.

Specifically, M time resources, for example, a radio frame, a subframe, and a timeslot, may be classified into one group. Each of the time resources further includes N frequency resources, for example, a physical resource block (Physical Resource Block, "PRB" for short) and a subcarrier, where M and N are positive integers, which is not limited in this embodiment of the present disclosure.

It should be understood that, after the grouping, in the physical resource groups, a same resource number determined according to a preset grouping method may fall into four occasions: having a same time sequence number and a same frequency sequence number, or having a same time sequence number and different frequency sequence numbers, or having different time sequence numbers and a same frequency sequence number, or having different time sequence numbers and different frequency sequence numbers. Grouping methods meeting the foregoing for occasions all fall within the protection scope of this embodiment of the present disclosure.

According to this embodiment of the present disclosure, when a same resource number in different physical resource groups is corresponding to a same time sequence number and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is floor(x/M), where mod( ) is a modulo function, floor( ) is a floor function, x is zero or a positive integer, and M and N are positive integers.

Specifically, as shown in FIG. 2, M is 5, and the time sequence number is from 0 to 4. N is 12, and the frequency sequence number is from 0 to 11. These time resources and frequency resources are numbered in a left-to-right order and a top-to-bottom order, so as to obtain a total of M×N 60 resource numbers. A time sequence number of each physical resource whose resource number is x is mod(x, M), and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is mod(x, M) and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In the foregoing embodiment, a same resource number in different physical resource groups is corresponding to a same physical resource. That is, physical resources corresponding to each of two resource numbers, for example, resource number 1 and resource number 21 in FIG. 2, in different physical resource groups are always the same, and a frequency spacing is always the same. Likewise, a time spacing of two resource numbers, for example, resource number 1 and resource number 5 in FIG. 2, in different physical resource groups is always the same. In this case, when data is sent by using a same resource number, a physical resource used in different physical resource groups is always the same. Therefore, interference to a system is always the same in different physical resource groups, and interference randomization cannot be achieved.

In order to overcome a problem existing in FIG. 2, another embodiment is put forward. When a same resource number in different physical resource groups is corresponding to a same time sequence number and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

Specifically, as shown in FIG. 3, the sequence number P of the physical resource group is from 0 to 2, M is 5, and the time sequence number is from 0 to 4. N is 12, the frequency sequence number is from 0 to 11, and $Q_f$ is 4. These time resources and frequency resources are numbered. A time sequence number of each physical resource whose resource number is x is mod(x, M), and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is mod(x, M) and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, frequency sequence numbers of physical resources corresponding to each of two resource numbers, for example, resource number 1 and resource number 21 in FIG. 3, in different physical resource groups are different. In this case, when data is sent by using a same resource number, frequency sequence numbers of physical resources used in different physical resource groups are different. Therefore, frequency-domain interference to a system is different in different physical resource groups, and frequency-domain interference randomization can be achieved.

In order to overcome the problem existent in FIG. 2, another embodiment is put forward. When a same resource number in different physical resource groups is corresponding to different time sequence numbers and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

$$\mod \{\mod(x,M) - \mod [[floor(x/M)+1]*Q_t*P, M-1], M\},$$

$$\mod \{\mod(x,M) + \mod [[floor(x/M)+1]*Q_t*P, M-1], M\},$$

$$\mod \{\mod(x,M) - [\mod [floor(x/M), M-1]+1]*Q_t*P, M\}, \text{ or}$$

$$\mod \{\mod(x,M) + [\mod [floor(x/M), M-1]+1]*Q_t*P, M\},$$

and a frequency sequence number of the physical resource is floor(x/M), where mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

Specifically, as shown in FIG. 4, the sequence number P of the physical resource group is from 0 to 2, M is 5, and the time sequence number is from 0 to 4. N is 12, the frequency sequence number is from 0 to 11, and $Q_t$ is 1. These time resources and frequency resources are numbered. A time sequence number of each physical resource whose resource number is x is:

$$\mod \{\mod(x,M) - \mod [[floor(x/M)+1]*Q_t*P, M-1], M\},$$

$$\mod \{\mod(x,M) + \mod [[floor(x/M)+1]*Q_t*P, M-1], M\},$$

$$\mod \{\mod(x,M) - [\mod [floor(x/M), M-1]+1]*Q_t*P, M\}, \text{ or}$$

$$\mod \{\mod(x,M) + [\mod [floor(x/M), M-1]+1]*Q_t*P, M\},$$

and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is:

$$\mod \{\mod(x,M) - \mod [[floor(x/M)+1]*Q_t*P, M-1], M\},$$

$$\mod \{\mod(x,M)+\mod [[floor(x/M)+1]*Q_t*P, M-1], M\},$$

$$\mod \{\mod(x,M)-[\mod [floor(x/M),M-1]+1]*Q_t*P, M\}, \text{ or}$$

$$\mod \{\mod(x,M)+[\mod [floor(x/M),M-1]+1]*Q_t*P, M\},$$

and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers of physical resources corresponding to each of two resource numbers, for example, resource number 1 and resource number 21 in FIG. 4, in different physical resource groups are different. In this case, when data is sent by using a same resource number, time sequence numbers of physical resources used in different physical resource groups are different. Therefore, time-domain interference to a system is different in different physical resource groups, and time-domain interference randomization can be achieved.

The embodiment in FIG. 3 overcomes a problem of the frequency-domain interference, but a problem that the time-domain interference cannot be randomized still exists; likewise, the embodiment in FIG. 4 overcomes a problem of the time-domain interference, but a problem that the frequency-domain interference cannot be randomized still exists; therefore, system performance is still affected.

In order to better overcome the problem existent in FIG. 2, another embodiment is put forward. When a same resource number in different physical resource groups is corresponding to different time sequence numbers and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

$$\mod \{\mod(x,M)-\mod [[floor(x/M)+1]*Q_t*P, M-1], M\},$$

$$\mod \{\mod(x,M)+\mod [[floor(x/M)+1]*Q_t*P, M-1], M\},$$

$$\mod \{\mod(x,M)-[\mod [floor(x/M),M-1]+1]*Q_t*P, M\}, \text{ or}$$

$$\mod \{\mod(x,M)+[\mod [floor(x/M),M-1]+1]*Q_t*P, M\},$$

and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

Specifically, as shown in FIG. 5, the sequence number P of the physical resource group is from 0 to 2, M is 5, and the time sequence number is from 0 to 4. N is 12, the frequency sequence number is from 0 to 11, $Q_t$ is 1, and $Q_f$ is 4. These time resources and frequency resources are numbered. A time sequence number of each physical resource whose resource number is x is:

$$\mod \{\mod(x,M)-\mod [[floor(x/M)+1]*Q_t*P, M-1], M\},$$

$$\mod \{\mod(x,M)+\mod [[floor(x/M)+1]*Q_t*P, M-1], M\},$$

$$\mod \{\mod(x,M)-[\mod [floor(x/M),M-1]+1]*Q_t*P, M\}, \text{ or}$$

$$\mod \{\mod(x,M)+[\mod [floor(x/M),M-1]+1]*Q_t*P, M\},$$

and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is:

$$\mod \{\mod(x,M)-\mod [[floor(x/M)+1]*Q_t*P, M-1], M\},$$

$$\mod \{\mod(x,M)+\mod [[floor(x/M)+1]*Q_t*P, M-1], M\},$$

$$\mod \{\mod(x,M)-[\mod [floor(x/M),M-1]+1]*Q_t*P, M\}, \text{ or}$$

$$\mod \{\mod(x,M)+[\mod [floor(x/M),M-1]+1]*Q_t*P, M\},$$

and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers and frequency sequence numbers of physical resources corresponding to each of two resource numbers, for example, resource number 1 and resource number 21 in FIG. 5, in different physical resource groups are different. In this case, when data is sent by using a same resource number, time sequence numbers and frequency sequence numbers of physical resources used in different physical resource groups are different. Therefore, time-domain interference and frequency-domain interference to a system are different in different physical resource groups, and time-domain interference randomization and frequency-domain interference randomization can be achieved.

Correspondingly, in another embodiment, M may be a positive integer greater than or equal to 2 and/or N may be a positive integer greater than or equal to 2.

It should be understood that, the grouping of multiple time resources and/or multiple frequency resources can better reflect a technical advantage of this embodiment of the present disclosure in solving a technical problem that a scheduling assignment signal cannot accurately indicate a physical resource that carries a control signal.

According to this embodiment of the present disclosure, the time information is a time resource number, the frequency information is a frequency resource number, and among different time resource numbers, a same frequency resource number is corresponding to a same frequency sequence number or different frequency sequence numbers.

Specifically, the time resource number may include one or more time sequence numbers, which is not limited in this embodiment of the present disclosure.

It should be understood that, a same frequency resource number determined according to a preset method among different time resource numbers or among different time sequence numbers, may be corresponding to a same frequency sequence number or different frequency sequence numbers. Methods that meet these two occasions fall within the protection scope of this embodiment of the present disclosure.

Alternatively, in another embodiment, when among different time resource numbers, a same frequency resource number is corresponding to a same frequency sequence number, a frequency sequence number of a physical resource whose frequency resource number is x is mod(x, N), where mod( ) is a modulo function, x is zero or a positive integer, and N is a positive integer and indicates a quantity of frequency resource numbers corresponding to each time sequence number.

FIG. 6 is a schematic diagram of a result of indicating a physical resource that carries a control signal in a signal transmission method according to another embodiment of the present disclosure. Specifically, as shown in FIG. 6, the time sequence number is from 0 to 11, N is 12, and the frequency sequence number is from 0 to 11. A frequency sequence number of a physical resource whose frequency resource number is x is mod(x, N). That is, an indication signal may instruct to use any physical resource whose time sequence number is specified and whose frequency sequence number is mod(x, N) to carry a control signal, so that a receive end can detect and acquire the control signal on the physical resource whose time sequence number is specified and whose frequency sequence number is mod(x, N).

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

Alternatively, in another embodiment, when among different time resource numbers, a same frequency resource number is corresponding to different frequency sequence numbers, a frequency sequence number of a physical resource whose frequency resource number is x is mod(x+$P_t$*$Q_f$, N), where mod( ) is a modulo function, $P_t$ indicates a time sequence number and is zero or a positive integer, N indicates a quantity of frequency resource numbers corresponding to each time sequence number, that is, a quantity of frequency sequence numbers, $Q_f$ is a frequency hopping step, x is zero or a positive integer, and N and $Q_f$ are positive integers.

Specifically, as shown in FIG. 7, the time sequence number $P_t$ is from 0 to 11, N is 12, the frequency sequence number is from 0 to 11, and $Q_f$ is 1. A frequency sequence number of a physical resource whose frequency resource number is x is mod(x+$P_t$*$Q_f$, N). That is, an indication signal may instruct to use a physical resource whose time sequence number is $P_t$ and whose frequency sequence number is mod(x+$P_t$*$Q_f$, N) to carry a control signal, so that a receive end can detect and acquire the control signal on the physical resource whose time sequence number is $P_t$ and whose frequency sequence number is mod(x+$P_t$*$Q_f$, N).

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

In addition, in the foregoing embodiment, among different time sequence numbers, a same frequency resource number is corresponding to different frequency sequence numbers. That is, among different time sequence numbers, frequency sequence numbers corresponding to each of two frequency resource numbers are different, for example, frequency resource number 1 and frequency resource number 5 in FIG. 7. In this case, frequency-domain interference randomization can be achieved.

Correspondingly, in another embodiment, $Q_f$ and/or $Q_t$ are/is determined by a cell identity, for example, $Q_f$=mod(ID_cell, N) and/or $Q_t$=mod(ID_cell,M), where ID_cell is the cell identity.

It should be understood that, by using the cell identity to determine the frequency hopping step and/or the timing hopping step, inter-cell interference randomization may be achieved, thereby helping the receive end to suppress or cancel inter-cell interference.

Alternatively, in another embodiment, the cell identity may be a physical cell identity (Physical Cell identity, "PCI" for short).

It should be understood that, in an LTE communications system, by using the physical cell identity to determine the frequency hopping step and/or the timing hopping step, inter-cell interference randomization may be achieved, thereby helping the receive end to suppress or cancel inter-cell interference.

Alternatively, in another embodiment, that the resource numbers are determined after the user equipment groups the physical resources occupied by the one or more control signals includes the following: The user equipment determines the resource numbers according to a result of the grouping, where the result of the grouping is acquired from the third party or the receive end, that is, the receive end or the third party groups the physical resources occupied by the one or more control signals.

Alternatively, in another embodiment, the user equipment includes a grouping unit, configured to group, according to a correspondence between resource numbers and physical resources occupied by one or more control signals, the physical resources occupied by the one or more control signals, and then determine the resource numbers according to a result of the grouping, where the correspondence between resource numbers and physical resources occupied by one or more control signals is preset, is fed back from the receive end, or is provided by the third party.

Alternatively, in another embodiment, the first sending unit is specifically configured to send the correspondence between resource numbers and physical resources occupied by one or more control signals to the receive end.

Optionally, the receiving unit is specifically configured to receive an indication signal sent by the base station.

Figure 9:
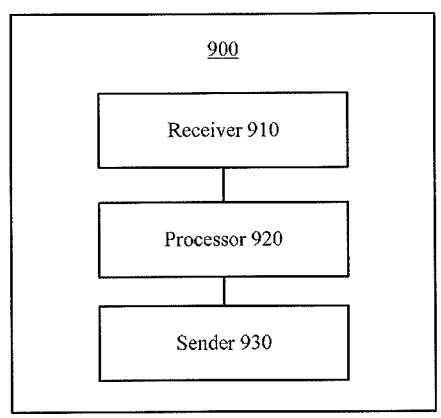
FIG. 9 is a schematic block diagram of a user equipment according to another embodiment of the present disclosure.

FIG. 9 is a schematic block diagram of a user equipment according to another embodiment of the present disclosure. As shown in FIG. 9, a user equipment 900 includes a receiver 910, a processor 920, and a sender 930. The receiver 910 is configured to receive an indication signal, where the indication signal is used to indicate resource numbers of physical resources occupied by one or more control signals, for example, a scheduling assignment (Scheduling Assignment, "SA" for short) signal, where the resource number includes time information and frequency information of the physical resource.

The processor 920 is configured to allocate corresponding physical resources to the one or more control signals according to the resource numbers.

The sender 930 is further configured to send the one or more control signals.

The user equipment provided in this embodiment of the present disclosure can accurately indicate a physical resource that carries a control signal, and therefore a receive end can receive the control signal without a need to perform blind detection, thereby saving processing time and electric energy consumption at the receive end.

The user equipment 900 may also include a memory, where the memory may include a read-only memory and a random access memory, and provide an instruction and data for the processor 920. A part of the memory may further include a nonvolatile random access memory. For example, the memory may further store information about a device type.

The method disclosed in the foregoing embodiment of the present disclosure may be applied to the processor 920, or implemented by the processor 920. The processor 920 may be an integrated circuit chip that has a signal processing capability. In an implementation process, steps in the foregoing method may be completed by means of an integrated logic circuit of hardware in the processor 920 or an instruction in a form of software. The foregoing processor 920 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic component, a discrete gate or a transistor logic component, or a discrete hardware component, which may implement or execute the method, the steps, and the logical block diagrams disclosed in embodiments of the present disclosure. The general purpose processor may be a microprocessor, or the processor may also be any conventional processor, or the like. The steps of the method disclosed with reference to the embodiments of the present disclosure may be directly executed and completed by using a hardware decoding processor, or executed and completed by combining a hardware module and a software module in a decoding processor. A software module may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory. The processor 920 reads information from the memory, and completes the steps of the foregoing method in combination with the hardware. To avoid repetition, details are not described herein again.

The user equipment in FIG. 9 is corresponding to the signal transmission method in FIG. 1, and therefore the user equipment in this embodiment of the present disclosure may be described in detail with reference to FIG. 2 to FIG. 7.

FIG. 2 to FIG. 5 are several schematic diagrams of results of grouping physical resources that carry control signals in the signal transmission method according to an embodiment of the present disclosure, and FIG. 6 and FIG. 7 are schematic diagrams of results of indicating a physical resource that carries a control signal in the signal transmission method according to another embodiment of the present disclosure.

According to this embodiment of the present disclosure, the resource numbers are determined after the physical resources occupied by the one or more control signals are grouped, the time information is a time sequence number, and the frequency information is a frequency sequence number, where a same resource number in different physical resource groups is corresponding to a same time sequence number and a same frequency sequence number, or a same resource number in different physical resource groups is corresponding to a same time sequence number and different frequency sequence numbers, or a same resource number in different physical resource groups is corresponding to different time sequence numbers and a same frequency sequence number, or a same resource number in different physical resource groups is corresponding to different time sequence numbers and different frequency sequence numbers.

Specifically, the resource numbers are determined after a base station, the user equipment, or a third party groups the physical resources occupied by the one or more control signals, which is not limited in this embodiment of the present disclosure.

Specifically, M time resources, for example, a radio frame, a subframe, and a timeslot, may be classified into one group. Each of the time resources further includes N frequency resources, for example, a physical resource block (Physical Resource Block, "PRB" for short) and a subcarrier, where M and N are positive integers, which is not limited in this embodiment of the present disclosure.

It should be understood that, after the grouping, in the physical resource groups, a same resource number determined according to a preset grouping method may fall into four occasions: having a same time sequence number and a same frequency sequence number, or having a same time sequence number and different frequency sequence numbers, or having different time sequence numbers and a same frequency sequence number, or having different time sequence numbers and different frequency sequence numbers. Grouping methods meeting the foregoing four occasions all fall within the protection scope of this embodiment of the present disclosure.

According to this embodiment of the present disclosure, when a same resource number in different physical resource groups is corresponding to a same time sequence number and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is floor(x/M), where mod( ) is a modulo function, floor( ) is a floor function, x is zero or a positive integer, and M and N are positive integers.

Specifically, as shown in FIG. 2, M is 5, and the time sequence number is from 0 to 4. N is 12, and the frequency sequence number is from 0 to 11. These time resources and frequency resources are numbered in a left-to-right order and a top-to-bottom order, so as to obtain a total of M×N 60 resource numbers. A time sequence number of each physical resource whose resource number is x is mod(x, M), and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is mod(x, M) and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In the foregoing embodiment, a same resource number in different physical resource groups is corresponding to a same physical resource. That is, physical resources corresponding to each of two resource numbers, for example, resource number 1 and resource number 21 in FIG. 2, in different physical resource groups are always the same, and a frequency spacing is always the same. Likewise, a time spacing of two resource numbers, for example, resource number 1 and resource number 5 in FIG. 2, in different physical resource groups is always the same. In this case, when data is sent by using a same resource number, a physical resource used in different physical resource groups is always the same. Therefore, interference to a system is always the same in different physical resource groups, and interference randomization cannot be achieved.

In order to overcome a problem existing in FIG. 2, another embodiment is put forward. When a same resource number in different physical resource groups is corresponding to a same time sequence number and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is mod(x, M), and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

Specifically, as shown in FIG. 3, the sequence number P of the physical resource group is from 0 to 2, M is 5, and the time sequence number is from 0 to 4. N is 12, the frequency sequence number is from 0 to 11, and $Q_f$ is 4. These time resources and frequency resources are numbered. A time sequence number of each physical resource whose resource number is x is mod(x, M), and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is mod(x, M) and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, frequency sequence numbers of physical resources corresponding to each of two resource numbers, for example, resource number 1 and resource number 21 in FIG. 3, in different physical resource groups are different. In this case, when data is sent by using a same resource number, frequency sequence numbers of physical resources used in different physical resource groups are different. Therefore, frequency-domain interference to a system is different in different physical resource groups, and frequency-domain interference randomization can be achieved.

In order to overcome the problem existent in FIG. 2, another embodiment is put forward. When a same resource number in different physical resource groups is corresponding to different time sequence numbers and a same frequency sequence number, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

$$\mod \{\mod(x,M) - \mod [[\mathrm{floor}(x/M)+1]*Q_t*P, M-1], M\},$$

$$\mod \{\mod(x,M) + \mod [[\mathrm{floor}(x/M)+1]*Q_t*P, M-1], M\},$$

$$\mod \{\mod(x,M) - [\mod [\mathrm{floor}(x/M), M-1]+1]*Q_t*P, M\}, \text{ or}$$

$$\mod \{\mod(x,M) + [\mod [\mathrm{floor}(x/M), M-1]+1]*Q_t*P, M\},$$

and a frequency sequence number of the physical resource is floor(x/M), where mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

Specifically, as shown in FIG. 4, the sequence number P of the physical resource group is from 0 to 2, M is 5, and the time sequence number is from 0 to 4. N is 12, the frequency sequence number is from 0 to 11, and $Q_t$ is 1. These time resources and frequency resources are numbered. A time sequence number of each physical resource whose resource number is x is:

$$\mod \{\mod(x,M) - \mod [[\mathrm{floor}(x/M)+1]*Q_t*P, M-1], M\},$$

$$\mod \{\mod(x,M) + \mod [[\mathrm{floor}(x/M)+1]*Q_t*P, M-1], M\},$$

$$\mod \{\mod(x,M) - [\mod [\mathrm{floor}(x/M), M-1]+1]*Q_t*P, M\}, \text{ or}$$

$$\mod \{\mod(x,M) + [\mod [\mathrm{floor}(x/M), M-1]+1]*Q_t*P, M\},$$

and a frequency sequence number of the physical resource is floor(x/M). That is, after the grouping, an indication signal may instruct to use the physical resource whose resource number is x to carry a control signal, so that a receive end can detect and acquire the control signal on the physical resource whose time sequence number is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and whose frequency sequence number is floor(x/M).

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers of physical resources corresponding to each of two resource numbers, for example, resource number 1 and resource number 21 in FIG. 4, in different physical resource groups are different. In this case, when data is sent by using a same resource number, time sequence numbers of physical resources used in different physical resource groups are different. Therefore, time-domain interference to a system is different in different physical resource groups, and time-domain interference randomization can be achieved.

The embodiment in FIG. 3 overcomes a problem of the frequency-domain interference, but a problem that the time-domain interference cannot be randomized still exists; likewise, the embodiment in FIG. 4 overcomes a problem of the time-domain interference, but a problem that the frequency-domain interference cannot be randomized still exists; therefore, system performance is still affected.

In order to better overcome the problem existent in FIG. 2, another embodiment is put forward. When a same resource number in different physical resource groups is corresponding to different time sequence numbers and different frequency sequence numbers, each of the physical resource groups includes M time resources; each of the time resources includes N frequency resources; and in this case, each of the physical resource groups includes M*N physical resources, that is, includes M*N resource numbers. Therefore, a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N], where mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

Specifically, as shown in FIG. 5, the sequence number P of the physical resource group is from 0 to 2, M is 5, and the time sequence number is from 0 to 4. N is 12, the frequency sequence number is from 0 to 11, $Q_t$ is 1, and $Q_f$ is 4. These time resources and frequency resources are numbered. A time sequence number of each physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N]. That is, after the grouping, an indication signal may instruct to use the physical resource whose resource number is x to carry a control signal, so that a receive end can detect and acquire the control signal on the physical resource whose time sequence number is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and whose frequency sequence number is mod [floor(x/M)+P*$Q_f$, N].

Therefore, in this embodiment of the present disclosure, by grouping physical resources that include multiple time resources and multiple frequency resources, an indication signal may accurately indicate a resource number of a physical resource that carries a control signal, so that a receive end can detect and acquire the control signal on a corresponding physical resource without a need to perform a complex action, such as blind detection, thereby saving processing time and electric energy consumption at the receive end.

In addition, in the foregoing embodiment, a same resource number in different physical resource groups is corresponding to different physical resources. That is, time sequence numbers and frequency sequence numbers of physical resources corresponding to each of two resource numbers, for example, resource number 1 and resource number 21 in FIG. 5, in different physical resource groups are different. In this case, when data is sent by using a same resource number, time sequence numbers and frequency sequence numbers of physical resources used in different physical resource groups are different. Therefore, time-domain interference and frequency-domain interference to a system are different in different physical resource groups, and time-domain interference randomization and frequency-domain interference randomization can be achieved.

Correspondingly, in another embodiment, M may be a positive integer greater than or equal to 2 and/or N may be a positive integer greater than or equal to 2.

It should be understood that, the grouping of multiple time resources and/or multiple frequency resources can better reflect a technical advantage of this embodiment of the present disclosure in solving a technical problem that a scheduling assignment signal cannot accurately indicate a physical resource that carries a control signal.

According to this embodiment of the present disclosure, the time information is a time resource number, the frequency information is a frequency resource number, and among different time resource numbers, a same frequency resource number is corresponding to a same frequency sequence number or different frequency sequence numbers.

Specifically, the time resource number may include one or more time sequence numbers, which is not limited in this embodiment of the present disclosure.

It should be understood that, a same frequency resource number determined according to a preset method among different time resource numbers or among different time sequence numbers, may be corresponding to a same frequency sequence number or different frequency sequence numbers. Methods that meet these two occasions fall within the protection scope of this embodiment of the present disclosure.

Alternatively, in another embodiment, when among different time resource numbers, a same frequency resource number is corresponding to a same frequency sequence number, a frequency sequence number of a physical resource whose frequency resource number is x is mod(x, N), where mod( ) is a modulo function, x is zero or a positive integer, and N is a positive integer and indicates a quantity of frequency resource numbers corresponding to each time sequence number.

FIG. 6 is a schematic diagram of a result of indicating a physical resource that carries a control signal in a signal transmission method according to another embodiment of the present disclosure. Specifically, as shown in FIG. 6, the time sequence number is from 0 to 11, N is 12, and the frequency sequence number is from 0 to 11. A frequency sequence number of a physical resource whose frequency resource number is x is mod(x, N). That is, an indication signal may instruct to use any physical resource whose time sequence number is specified and whose frequency sequence number is mod(x, N) to carry a control signal, so that a receive end can detect and acquire the control signal on the physical resource whose time sequence number is specified and whose frequency sequence number is mod(x, N).

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

Alternatively, in another embodiment, when among different time resource numbers, a same frequency resource number is corresponding to different frequency sequence numbers, a frequency sequence number of a physical resource whose frequency resource number is x is mod(x+$P_t$*$Q_f$, N), where mod( ) is a modulo function, $P_t$ indicates a time sequence number and is zero or a positive integer, N indicates a quantity of frequency resource numbers corresponding to each time sequence number, that is, a quantity of frequency sequence numbers, $Q_f$ is a frequency hopping step, x is zero or a positive integer, and N and $Q_f$ are positive integers.

Specifically, as shown in FIG. 7, the time sequence number $P_t$ is from 0 to 11, N is 12, the frequency sequence number is from 0 to 11, and $Q_f$ is 1. A frequency sequence number of a physical resource whose frequency resource number is x is mod(x+$P_t$*$Q_f$, N). That is, an indication signal may instruct to use a physical resource whose time sequence number is $P_t$ and whose frequency sequence number is mod(x+$P_t$*$Q_f$, N) to carry a control signal, so that a receive end can detect and acquire the control signal on the physical resource whose time sequence number is $P_t$ and whose frequency sequence number is mod(x+$P_t$*$Q_f$, N).

Therefore, in this embodiment of the present disclosure, a frequency sequence number and a time sequence number of a physical resource that carries a control signal may be indicated by using an indication signal, so that a receive end can detect and acquire the control signal on a corresponding physical resource without a need to perform a complex action, such as blind detection, thereby saving processing time and electric energy consumption at the receive end.

In addition, in the foregoing embodiment, among different time sequence numbers, a same frequency resource number is corresponding to different frequency sequence numbers. That is, among different time sequence numbers, frequency sequence numbers corresponding to each of two frequency resource numbers are different, for example, frequency resource number 1 and frequency resource number 5 in FIG. 7. In this case, frequency-domain interference randomization can be achieved.

Correspondingly, in another embodiment, $Q_f$ and/or $Q_t$ are/is determined by a cell identity, for example, $Q_f$=mod(ID_cell, N) and/or $Q_t$=mod(ID_cell,M), where ID_cell is the cell identity.

It should be understood that, by using the cell identity to determine the frequency hopping step and/or the timing hopping step, inter-cell interference randomization may be achieved, thereby helping the receive end to suppress or cancel inter-cell interference.

Alternatively, in another embodiment, the cell identity may be a physical cell identity (Physical Cell identity, "PCI" for short).

It should be understood that, in an LTE communications system, by using the physical cell identity to determine the frequency hopping step and/or the timing hopping step, inter-cell interference randomization may be achieved, thereby helping the receive end to suppress or cancel inter-cell interference.

Alternatively, in another embodiment, that the resource numbers are determined after the user equipment groups the physical resources occupied by the one or more control signals includes the following: The user equipment determines the resource numbers according to a result of the grouping, where the result of the grouping is acquired from the third party or the receive end, that is, the receive end or the third party groups the physical resources occupied by the one or more control signals.

Alternatively, in another embodiment, the processor 920 is specifically configured to group, according to a correspondence between resource numbers and physical resources occupied by one or more control signals, the physical resources occupied by the one or more control signals, and then determine the resource numbers according to a result of the grouping, where the correspondence between resource numbers and physical resources occupied by one or more control signals is preset, is fed back from the receive end, or is provided by the third party.

Alternatively, in another embodiment, the sender 930 is specifically configured to send the correspondence between resource numbers and physical resources occupied by one or more control signals to the receive end.

Optionally, the receiver 910 is specifically configured to receive an indication signal sent by the base station.

It should be noted that, the user equipment shown in FIG. 9 can implement all processes completed by a user equipment in the method embodiment in FIG. 1. For other functions and operations of the user equipment 900, refer to processes that involve the user equipment in the method embodiment in FIG. 1. To avoid repetition, details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

An embodiment of the present disclosure provides a user equipment, comprising: a receiving unit, configured to receive an indication signal, wherein the indication signal is used to indicate resource numbers of physical resources occupied by one or more control signals, wherein the resource number comprises time information and frequency information of the physical resource; an allocating unit, configured to allocate corresponding physical resources to the one or more control signals according to the resource numbers; and a sending unit, configured to send the one or more control signals.

In a first development of the user equipment according to the embodiment, the resource numbers are determined after the physical resources occupied by the one or more control signals are grouped, the time information is a time sequence number, and the frequency information is a frequency sequence number, wherein: a same resource number in different physical resource groups is corresponding to a same time sequence number and a same frequency sequence number; or a same resource number in different physical resource groups is corresponding to a same time sequence number and different frequency sequence numbers; or a same resource number in different physical resource groups is corresponding to different time sequence numbers and a same frequency sequence number; or a same resource number in different physical resource groups is corresponding to different time sequence numbers and different frequency sequence numbers.

In a second development of the user equipment according to the embodiment, when a same resource number in different physical resource groups is corresponding to a same time sequence number and a same frequency sequence number, each of the physical resource groups comprises M time resources; each of the time resources comprises N frequency resources; and therefore a time sequence number of a physical resource whose resource number is x is mod(x, M), and a frequency sequence number of the physical resource is floor(x/M), wherein mod( ) is a modulo function, floor( ) is a floor function, x is zero or a positive integer, and M and N are positive integers.

In a third development of the user equipment according to the embodiment, when a same resource number in different physical resource groups is corresponding to a same time sequence number and different frequency sequence numbers, each of the physical resource groups comprises M time resources; each of the time resources comprises N frequency resources; and therefore a time sequence number of a physical resource whose resource number is x is mod(x, M), and a frequency sequence number of the physical resource is mod [floor(x/M)+P*$Q_f$, N], wherein mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

In a fourth development of the user equipment according to the embodiment, when a same resource number in different physical resource groups is corresponding to different time sequence numbers and a same frequency sequence number, each of the physical resource groups comprises M time resources; each of the time resources comprises N frequency resources; and therefore a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is floor(x/M), wherein mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

In a fifth development of the user equipment according to the embodiment, when a same resource number in different physical resource groups is corresponding to different time sequence numbers and different frequency sequence numbers, each of the physical resource groups comprises M time resources; each of the time resources comprises N frequency resources; and therefore a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N], wherein mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

In a sixth development of the user equipment according to the embodiment, the time information is a time resource number, the frequency information is a frequency resource number, and among different time resource numbers, a same frequency resource number is corresponding to a same frequency sequence number or different frequency sequence numbers.

In a seventh development of the user equipment according to the embodiment, when among different time resource numbers, a same frequency resource number is corresponding to a same frequency sequence number, a frequency sequence number of a physical resource whose frequency resource number is x is mod(x, N), wherein mod( ) is a modulo function, x is zero or a positive integer, and N is a positive integer and indicates a quantity of frequency resource numbers corresponding to each time sequence number.

In an eighth development of the user equipment according to the embodiment, when among different time resource numbers, a same frequency resource number is corresponding to different frequency sequence numbers, a frequency sequence number of a physical resource whose frequency resource number is x is mod(x+$P_t$*$Q_f$, N), wherein mod( ) is a modulo function, $P_t$ indicates a time sequence number and is zero or a positive integer, N indicates a quantity of frequency resource numbers corresponding to each time sequence number, $Q_f$ is a frequency hopping step, x is zero or a positive integer, and N and $Q_f$ are positive integers.

In a ninth development of the user equipment according to the embodiment, $Q_f$ and/or $Q_t$ are/is determined by a cell identity.

In a tenth development of the user equipment according to the embodiment, $Q_f$=mod(ID_cell, N) and/or $Q_t$=mod(ID_cell,M), wherein ID_cell is the cell identity.

In an eleventh development of the user equipment according to the embodiment, the cell identity is a physical cell identity.

In a twelfth development of the user equipment according to the embodiment, M is a positive integer greater than or equal to 2 and/or N is a positive integer greater than or equal to 2.

In a thirteenth development of the user equipment according to the embodiment, the receiving unit is specifically configured to receive an indication signal sent by a base station.

What is claimed is:

1. A signal transmission method, comprising:
receiving, by a user equipment, an indication signal, wherein the indication signal is used to indicate resource numbers corresponding to physical resources occupied by one or more control signals, wherein a resource number corresponding to a physical resource comprises time information and frequency information of the physical resource;

allocating, by the user equipment according to the resource numbers, one or more physical resources corresponding to the one or more control signals; and sending, by the user equipment, the one or more control signals, wherein the resource numbers are determined after the physical resources occupied by the one or more control signals are grouped, the time information is a time sequence number, and the frequency information is a frequency sequence number, and wherein:
- a same resource number in different physical resource groups corresponds to a same time sequence number and a same frequency sequence number; or
- a same resource number in different physical resource groups corresponds to a same time sequence number and different frequency sequence numbers; or
- a same resource number in different physical resource groups corresponds to different time sequence numbers and a same frequency sequence number; or
- a same resource number in different physical resource groups corresponds to different time sequence numbers and different frequency sequence numbers.

2. The method according to claim 1, wherein:

when a same resource number in different physical resource groups corresponds to a same time sequence number and a same frequency sequence number, each of the physical resource groups comprises M time resources, and each of the time resources comprises N frequency resources; and a time sequence number of a physical resource whose resource number is x is $mod(x, M)$, and a frequency sequence number of the physical resource is $floor(x/M)$, wherein $mod()$ is a modulo function, $floor()$ is a floor function, x is zero or a positive integer, and M and N are positive integers.

3. The method according to claim 1, wherein:

when a same resource number in different physical resource groups is corresponds a same time sequence number and different frequency sequence numbers, each of the physical resource groups comprises M time resources, and each of the time resources comprises N frequency resources; and a time sequence number of a physical resource whose resource number is x is $mod(x, M)$, and a frequency sequence number of the physical resource is $mod[floor(x/M)+P*Q_f, N]$, wherein $mod()$ is a modulo function, $floor()$ is a floor function, P indicates a sequence number of a physical resource group and is zero or a positive integer, $Q_f$ is a frequency hopping step, x is zero or a positive integer, and M, N, and $Q_f$ are positive integers.

4. The method according to claim 1, wherein:

when a same resource number in different physical resource groups corresponds to different time sequence numbers and a same frequency sequence number, each of the physical resource groups comprises M time resources, and each of the time resources comprises N frequency resources; and a time sequence number of a physical resource whose resource number is x is:

$mod\{mod(x,M)-mod[[floor(x/M)+1]*Q_t*P,M-1], M\}$, $mod\{mod(x,M)+mod[[floor(x/M)+1]*Q_t*P,M-1], M\}$, $mod\{mod(x,M)-[mod[floor(x/M),M-1]+1]*Q_t*P, M\}$, or $mod\{mod(x,M)+[mod[floor(x/M),M-1]+1]*Q_t*P, M\}$, and a frequency sequence number of the physical resource is $floor(x/M)$, wherein $mod()$ is a modulo function, $floor()$ is a floor function, P indicates a sequence number of a physical resource group and is zero or a positive integer, $Q_t$ is a timing hopping step, x is zero or a positive integer, and M, N, and $Q_t$ are positive integers.

5. The method according to claim 1, wherein:

when a same resource number in different physical resource groups corresponds to different time sequence numbers and different frequency sequence numbers, each of the physical resource groups comprises M time resources, and each of the time resources comprises N frequency resources; and a time sequence number of a physical resource whose resource number is x is:

$mod\{mod(x,M)-mod[[floor(x/M)+1]*Q_t*P,M-1], M\}$, $mod\{mod(x,M)+mod[[floor(x/M)+1]*Q_t*P,M-1], M\}$, $mod\{mod(x,M)-[mod[floor(x/M),M-1]+1]*Q_t*P, M\}$, or $mod\{mod(x,M)+[mod[floor(x/M),M-1]+1]*Q_t*P, M\}$, and a frequency sequence number of the physical resource is $mod[floor(x/M)+P*Q_f, N]$, wherein $mod()$ is a modulo function, $floor()$ is a floor function, P indicates a sequence number of a physical resource group and is zero or a positive integer, $Q_t$ is a timing hopping step, $Q_f$ is a frequency hopping step, x is zero or a positive integer, and M, IV, $Q_t$, and $Q_f$ are positive integers.

6. A signal transmission method, comprising:

receiving, by a user equipment, an indication signal, wherein the indication signal is used to indicate resource numbers corresponding to physical resources occupied by one or more control signals, wherein a resource number corresponding to a physical resource comprises time information and frequency information of the physical resource;

allocating, by the user equipment according to the resource numbers, one or more physical resources corresponding to the one or more control signals; and sending, by the user equipment, the one or more control signals, wherein:
- the time information is a time resource number,
- the frequency information is a frequency resource number, and
- among different time resource numbers, a same frequency resource number corresponds to a same frequency sequence number or different frequency sequence numbers.

7. The method according to claim 6, wherein when among different time resource numbers, a same frequency resource number corresponds to a same frequency sequence number, a frequency sequence number of a physical resource whose frequency resource number is x is $mod(x, N)$, wherein $mod()$ is a modulo function, x is zero or a positive integer, and N is a positive integer and indicates a quantity of frequency resource numbers corresponding to each time sequence number.

8. The method according to claim 6, wherein when among different time resource numbers, a same frequency resource number corresponds to different frequency sequence numbers, a frequency sequence number of a physical resource whose frequency resource number is x is mod(x+$P_t$*$Q_f$, N), wherein mod( ) is a modulo function, $P_t$ indicates a time sequence number and is zero or a positive integer, N indicates a quantity of frequency resource numbers corresponding to each time sequence number, $Q_f$ is a frequency hopping step, x is zero or a positive integer, and N and $Q_f$ are positive integers.

9. The method according to claim 8, wherein $Q_f$ and/or $Q_t$ are/is determined by a cell identity.

10. The method according to claim 9, wherein $Q_f$=mod (ID_cell, N) and/or Q=mod(ID_cell, M), wherein ID_cell is the cell identity.

11. The method according to claim 10, wherein the cell identity is a physical cell identity.

12. The method according to claim 2, wherein M is a positive integer greater than or equal to 2 and/or N is a positive integer greater than or equal to 2.

13. The method according to claim 1, wherein the receiving, by the user equipment, the indication signal comprises:
receiving, by the user equipment, the indication signal sent by a base station.

14. A user equipment, comprising:
a receiver, configured to receive an indication signal, wherein the indication signal is used to indicate resource numbers corresponding to physical resources occupied by one or more control signals, wherein a resource number corresponding to a physical resource comprises time information and frequency information of the physical resource;
a processor, configured to allocate one or more physical resources corresponding to the one or more control signals according to the resource numbers; and
a sender, configured to send the one or more control signals,
wherein the resource numbers are determined after the physical resources occupied by the one or more control signals are grouped, the time resource information is a time sequence number, and the frequency information is a frequency sequence number, and
wherein:
a same resource number in different physical resource groups corresponds to a same time sequence number and a same frequency sequence number; or
a same resource number in different physical resource groups corresponds to a same time sequence number and different frequency sequence numbers; or
a same resource number in different physical resource groups corresponds to different time sequence numbers and a same frequency sequence number; or
a same resource number in different physical resource groups corresponds to different time sequence numbers and different frequency sequence numbers.

15. The user equipment according to claim 14, wherein:
when a same resource number in different physical resource groups corresponds to a same time sequence number and a same frequency sequence number, each of the physical resource groups comprises M time resources, and each of the time resources comprises N frequency resources; and
a time sequence number of a physical resource whose resource number is x is mod(x, M), and a frequency sequence number of the physical resource is floor(x/M), wherein mod( ) is a modulo function, floor( ) is a floor function, x is zero or a positive integer, and M and N are positive integers.

16. The user equipment according to claim 14, wherein:
when a same resource number in different physical resource groups is corresponding to a same time sequence number and different frequency sequence numbers, each of the physical resource groups comprises M time resources, and each of the time resources comprises N frequency resources; and
a time sequence number of a physical resource whose resource number is x is mod(x, M), and a frequency sequence number of the physical resource is mod [floor(x/M)+P*$Q_f$, N], wherein mod( ) is a modulo function, floor( ) is a floor function, P indicates a sequence number of a physical resource group and is zero or a positive integer, $Q_f$ is a frequency hopping step, x is zero or a positive integer, and M, N, and $Q_f$ are positive integers.

17. The user equipment according to claim 14, wherein:
when a same resource number in different physical resource groups is corresponding to different time sequence numbers and a same frequency sequence number, each of the physical resource groups comprises M time resources, and each of the time resources comprises N frequency resources; and
a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is floor(x/M), wherein mod( ) is a modulo function, floor( ) is a floor function, P indicates a sequence number of a physical resource group and is zero or a positive integer, $Q_t$ is a timing hopping step, x is zero or a positive integer, and M, N, and $Q_t$ are positive integers.

18. The user equipment according to claim 14, wherein:
when a same resource number in different physical resource groups is corresponding to different time sequence numbers and different frequency sequence numbers, each of the physical resource groups comprises M time resources, and each of the time resources comprises N frequency resources; and
a time sequence number of a physical resource whose resource number is x is:

mod {mod(x,M)−mod [[floor(x/M)+1]*$Q_t$*P,M−1], M}, mod {mod(x,M)+mod [[floor(x/M)+1]*$Q_t$*P,M−1], M}, mod {mod(x,M)−[mod [floor(x/M),M−1]+1]*$Q_t$*P, M}, or mod {mod(x,M)+[mod [floor(x/M),M−1]+1]*$Q_t$*P, M}, and a frequency sequence number of the physical resource is mod [floor(x/M)+P*$Q_f$, N], wherein mod( ) is a modulo function, floor( ) is a floor function, P indicates a sequence number of a physical resource group and is zero or a positive integer, $Q_t$ is a timing hopping step, $Q_f$ is a frequency hopping step, x is zero or a positive integer, and M, N, $Q_t$, and $Q_f$ are positive integers.

* * * * *